US009667340B2

(12) United States Patent
Giles et al.

(10) Patent No.: US 9,667,340 B2
(45) Date of Patent: *May 30, 2017

(54) APPARATUS AND METHODS FOR PROVIDING SERVICE DISCOVERY OVER ALTERNATE TRANSPORTS

(71) Applicant: Apple Inc., Cupertino, CA (US)

(72) Inventors: Michael Jason Giles, San Jose, CA (US); Bob Bradley, Foster City, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/186,364

(22) Filed: Jun. 17, 2016

(65) Prior Publication Data
US 2016/0301464 A1 Oct. 13, 2016

Related U.S. Application Data

(63) Continuation of application No. 13/953,651, filed on Jul. 29, 2013, now Pat. No. 9,374,153, which is a
(Continued)

(51) Int. Cl.
H04B 7/00 (2006.01)
H04B 7/24 (2006.01)
(Continued)

(52) U.S. Cl.
CPC .............. H04B 7/24 (2013.01); H04L 67/16 (2013.01); H04L 67/303 (2013.01); H04L 69/14 (2013.01);
(Continued)

(58) Field of Classification Search
CPC .. H04B 7/24; H04L 67/16; H04L 39/24; H04L 67/303; H04W 88/06
(Continued)

(56) References Cited

U.S. PATENT DOCUMENTS 7,191,245 B2    3/2007  Takayama
9,374,153 B2 *  6/2016  Giles ..................... H04W 8/183
(Continued)

FOREIGN PATENT DOCUMENTS

EP    1608128 A1    12/2005

OTHER PUBLICATIONS

Liscano et al.: "SIP Session-based access to Bluetooth application profiles", Jul. 3, 2003, pp. 349-354, XP002342231.
(Continued)

Primary Examiner — Eugene Yun
(74) Attorney, Agent, or Firm — Downey Brand LLP

(57) ABSTRACT

Methods and apparatus for providing primary transport service discovery information over one or more alternate transports that are not normally associated with the primary transport services. In one embodiment, the primary transport comprises a first wireless interface (e.g., Bluetooth), and the alternate transport comprises a second wireless interface (e.g., WiFi or WiMAX). Service profile information relating to the primary transport is broadcast to other users over the alternate transport in a more efficient and streamlined manner than that available on the primary transport. The other users store this service profile information so that it can be subsequently accessed for service profile discovery of the transmitting device by those other devices, thereby obviating subsequent transfer of the data over any transport (primary or alternate).

20 Claims, 8 Drawing Sheets

Related U.S. Application Data continuation of application No. 12/214,969, filed on Jun. 23, 2008, now Pat. No. 8,499,079.

(51) Int. Cl.
*H04W 8/18* (2009.01)
*H04L 29/08* (2006.01)
*H04L 29/06* (2006.01)
*H04W 88/06* (2009.01)

(52) U.S. Cl.
CPC ............ *H04L 69/24* (2013.01); *H04W 8/183* (2013.01); *H04W 88/06* (2013.01)

(58) Field of Classification Search
USPC ........................................ 455/41.2
See application file for complete search history.

(56) References Cited

U.S. PATENT DOCUMENTS

| | | |
|---|---|---|
| 2004/0071123 A1 | 4/2004 | Shin |
| 2004/0248513 A1 | 12/2004 | Glass et al. |
| 2005/0010655 A1 | 1/2005 | Edwards et al. |
| 2005/0114534 A1 | 5/2005 | Lee |
| 2005/0128958 A1 | 6/2005 | Hamdan |
| 2005/0278646 A1 | 12/2005 | Liscano et al. |
| 2007/0002868 A1 | 1/2007 | Qian et al. |
| 2007/0117510 A1 | 5/2007 | Elixmann |
| 2007/0177554 A1 | 8/2007 | Yang et al. |
| 2011/0182205 A1 | 7/2011 | Gerdes et al. |

OTHER PUBLICATIONS

International Search Report for PCT Application No. PCT/US2009/048322, mailed Jan. 12, 2010.

European Examination Report dated Jun. 27, 2016, Application No. 09789914.0.

Ghanname Taoufik: "How NFC can to speed Bluetooth transactions today", Internet Citation, Feb. 14, 2006, XP002458023.

Indian Application No. 8097/CHENP/2010—First Examination Report (FER) dated Feb. 23, 2017.

* cited by examiner

FIG. 2    200
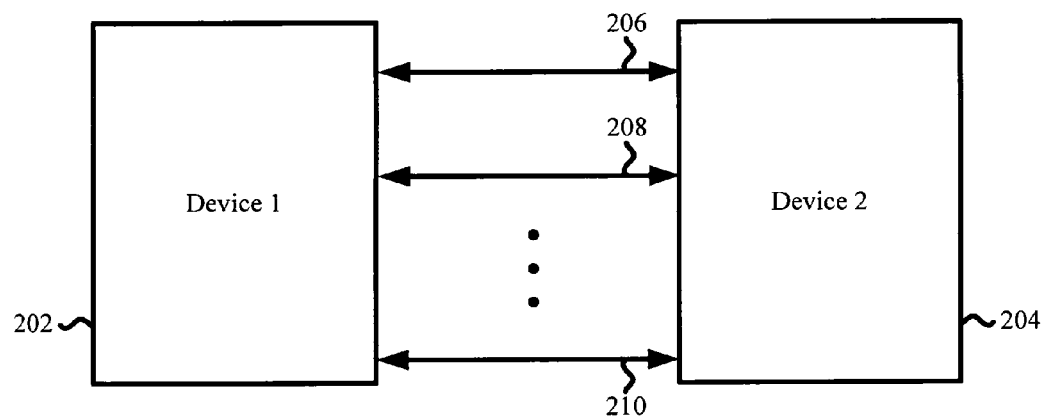

FIG. 6

| Device | Services Provided | Active |
|---|---|---|
| Printer | BPP | Yes |
| Mac Book 1 | A2DP<br>BIP<br>OPP | Yes |
| Mac Book 2 | A2DP<br>BIP<br>OPP<br>PBAP<br>GOEP<br>FAK | NO |

APPARATUS AND METHODS FOR PROVIDING SERVICE DISCOVERY OVER ALTERNATE TRANSPORTS

CROSS REFERENCE TO RELATED APPLICATIONS

This application is a continuation of U.S. patent application Ser. No. 13/953,651, filed Jul. 29, 2013, which is a continuation of U.S. patent application Ser. No. 12/214,969, filed Jun. 23, 2008, now issued as U.S. Pat. No. 8,499,079 on Jul. 30, 2013, both of which are incorporated by reference herein in their entireties.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of communication protocols and data networks. More particularly, in one exemplary aspect, the present invention is directed to the efficient transmittal of, inter alia, service profile information over alternate transports and/or using alternate protocols.

2. Description of Related Technology

Communication protocols, such as for example the well-known Bluetooth protocol and air interface specifications, include profiles that provide specific information about how a device is intended to be used, as well its intended manner of operation. At a minimum, most profile specifications contain information relating to: (1) dependencies between profiles; (2) suggested user interface formats; and (3) specific parts of the protocol stack used by the profile. To perform its task, each profile uses particular options and parameters at each layer of the stack.

In the exemplary context of Bluetooth, a large number of differing profiles for use with the Bluetooth protocol stack are included as part of the Bluetooth specification(s). These profiles include, without limitation: Advanced Audio Distribution Profile (A2DP); AudioNideo Remote Control Profile (AVRCP); Basic Imaging Profile (BIP); Basic Printing Profile (BPP); Common ISDN Access Profile (CIP); Cordless Telephony Profile (CTP); Device ID Profile (DID); Dial-up Networking Profile (DUN); Fax Profile (FAX); File Transfer Profile (FTP); General AudioNideo Distribution Profile (GAVDP); Generic Access Profile (GAP); Generic Object Exchange Profile (GOEP); Hard Copy Cable Replacement Profile (HCRP); Hands-Free Profile (HFP); Human Interface Device Profile (HID); Headset Profile (HSP); Intercom Profile (ICP); LAN Access Profile (LAP); Object Push Profile (OPP); Personal Area Networking Profile (PAN); Phone Book Access Profile (PBAP); Serial Port Profile (SPP); Service Discovery Application Profile (SDAP); SIM Access Profile (SAP, SIM); Synchronization Profile (SYNCH); Video Distribution Profile (VDP); and Wireless Application Protocol Bearer (WAPB). Extant methods for determining the available profiles offered by a given Bluetooth device are illustrated in FIG. 1.

FIG. 1 illustrates two Bluetooth devices 120, 130 in a wireless network 100 attempting to discover the available service profiles offered by the other. Device A 120 initiates a device discovery process, while device B 130 ensures that it can accept connections at 154. The devices 120, 130 must first establish a physical connection via a link establishment procedure at 156. This physical connection may comprise in the present context a wireless link between the transceivers of the two devices. Upon establishing a physical link, the two devices 120, 130 must then perform a channel establishment procedure to establish a logical connection between the devices 120, 130 at 158. After establishing both a link and logical channel, the two devices can then initiate a service discovery session at 160, after which the devices 120, 130 may optionally tear down there logical and physical links at 162, 164, respectively.

FIG. 1A illustrates a typical scenario in which two (2) Bluetooth devices exchange service profile information during a service discovery session. Typically, these service profiles are exchanged between a client application 102 and a server application 104. The client application 102 will send a request via a logical channel 106 to a service discovery profile (SDP) client 108. The SDP client 108 issues an SDP request 114 to the SDP server 112, which forwards the request onto the server application 104. The SDP server 112 responds via an SDP response 116 and the capabilities between the devices are exchanged.

While prior art methods for discovering available profiles in a Bluetooth device are adequate where time is not a constraint, and electromagnetic interference within a given geographic region is small, they can represent a burdensome task, especially where a large number of devices are available for discovery. Specifically, the traditional Bluetooth Service Discovery mechanism is an active, on-demand system, and must be performed at "connection time" on the device. Sometimes this mechanism is utilized, only to find out that the device doesn't support the feature in which the user is interested. There are also multiple steps required before a service discovery process can be performed, including device discovery and remote name resolution as generally illustrated in FIGS. 1 and 1A. This service discovery process can be a time-consuming process, and can overwhelm the wireless network resulting in undesirable latencies when a large number of devices are in close proximity to one another. Further, this service discovery process can also be error prone if the Bluetooth radios cannot "sync" properly due to electromagnetic interference. A typical problem scenario exists where a user is operating a Bluetooth I/O such as a keyboard and a mouse simultaneously, while attempting a SDP session with yet another Bluetooth device. Bluetooth devices in this given scenario may not even be able to establish a service discovery session due to the interference caused by the use of the Bluetooth keyboard and mouse in close proximity with the devices attempting an SDP session.

More generally, other service discovery protocols exist outside of Bluetooth as well. These include, without limitation, the Bonjour™ protocol developed by the Assignee hereof (Apple Inc.) which is utilized in, inter alia, Apple's Mac OS X operating system from version 10.2 onwards, and on Microsoft Windows operating systems (when installed). The exemplary Bonjour protocol is intended for use on local area networks (LANs) to locate devices such as printers, as well as other computers and file sharing servers, and the services that those devices offer. It is also used by Apple iTunes® to find shared music, iPhoto® to find shared photos, iChat®, to find other users on the local network, and TiVo Desktop to find digital video recorders and shared media libraries, among other uses. Accordingly, Bonjour comprises one exemplary application adapted to discover services on a local area network.

Other solutions have also been contemplated in the prior art for implementing various service discovery protocols within a given communications architecture or protocol. For example, U.S. Pat. No. 7,191,245 to Takayama issued Mar. 13, 2007 and entitled "Information processing apparatus and information processing method" discloses an information processing apparatus for allowing a non-networked unit to function as one unit disposed in a network environment. A network adapter obtains detailed profile data on the Internet according to simple profile data obtained from the outside. The network adapter enters service data generated according to these pieces of profile data, in a service discovery server. Then, the network adapter reads the service data from the service discovery server and refers to it to execute an operation for implementing service indicated by the service data by using an interface with a non-networked unit. With this, a function which cannot be implemented if the non-networked unit is not connected to a network is given to the non-networked unit through the network adapter.

United States Patent Publication No. 20050010655 to Edwards, et al. published Jan. 13, 2005 and entitled "Method and apparatus for dynamically delivering service profiles to clients" discloses a system that facilitates dynamic delivery of service profiles to a client. During operation, the system performs a discovery operation to allow the client to discover new services on a network. If a new service is discovered for which the client does not possess a service profile, the client obtains the service profile from the new service and subsequently installs it, thereby enabling the client to interact with the new service.

United States Patent Publication No. 20050128958 to Hamdan published Jun. 16, 2005 and entitled "Protocol for wireless multi-hop ad-hoc networks" discloses service provisioning in wireless peer-to-peer networks organized according to the store-and-forward messaging principle, in particular to a service discovery protocol for providing low-profile, low-overhead service discovery information needed for determining the availability of requested remote services in a wireless multi-hop ad-hoc network.

United States Patent Publication No. 20070117510 to Elixmann; published May 24, 2007 and entitled "System for responsive to detection, acoustically signaling desired nearby devices and services on a wireless network" discloses a distributed electronic system having at least one device G1 able to be perceived and at least one device G2 capable of perception, which latter has an acoustic output. To enable devices of a type being looked for by a user to be more easily perceived, G1 and G2 co-operate with one another by automatic intercommunication in such a way that the user learns at any time by means of audible signals which types of device are located in the area surrounding him. In an embodiment, G2 comprises a perception profile storing desired device-types for comparison in a Bluetooth service discovery process. G2 can be part of a headphone or hearing aid, and the audio sequences can be edited by an application linked to G2 via the ad-hoc interface.

Despite these various techniques, the prior art fails to provide service discovery protocols across differing or heterogeneous platforms, transports and network interfaces, especially where the use of these differing platforms, transports and network interfaces can accelerate the service profile discovery process. Consequently, improved apparatus and methods are needed which would permit the discovery of remote device service profiles over alternate communication transports, either exclusively or only under certain operating conditions. Further, such improved apparatus and methods would permit the discovery of additional information which would aid in the utilization of these service profiles. Such improved apparatus and methods would also ideally provide faster and more efficient transfer of service profiles between devices as compared to prior art service discovery techniques.

SUMMARY OF THE INVENTION

The present invention satisfies the aforementioned needs by providing improved apparatus and methods for service data transmission over multi-transport systems.

In a first aspect of the invention, a method of reducing the latency in service profile discovery between first and second user devices is disclosed. In one embodiment, each of the devices comprises a first transport associated with the service profile, and a second transport, and the method comprises: transmitting data relating to at least one service profile from the first user device to the second using the second transport; storing the transmitted data at the second device; and subsequently accessing the stored data at the second device when a service discovery for the first device is required. Accessing the stored data for the service discovery substantially obviates negotiation and communication over the first transport for the service discovery.

In one variant, the first transport comprises a Bluetooth transport, and the second transport comprises a TCP/IP-enabled transport.

In a second aspect of the invention, a method of providing one or more service profiles for a first protocol over a network via a second protocol is disclosed. In one embodiment, the method comprises: storing the one or more service profiles for the first protocol locally on a first computing device, the one or more service profiles associated with the first computing device; and transmitting the one or more service profiles to a second computing device via the second protocol. The first and second protocols differ, and the second computing device supports both the first and second protocols.

In one variant, the first protocol comprises Bluetooth, and the act of transmitting substantially eliminates a Bluetooth service discovery session.

In another variant, the one or more service profiles are stored where they are accessible by a service discovery application, the service discovery application able to communicate with other like applications via the second protocol.

In still another variant, the second protocol is selected from the group consisting of an IEEE Std. 802.3 (Ethernet), 802.11 (WiFi), or 802.16 (WiMAX) protocol, and the method further comprises storing the one or more service profiles of the first computing device at the second computing device.

In yet a further variant, the method further comprises transmitting one or more service profiles associated with the second computing device to the first computing device, the one or more service profiles associated with the first protocol of the second computing device, and storing at the first computing device the one or more service profiles associated with the second computing device.

In another variant, the method further comprises storing the one or more service profiles of the first computing device at the second computing device; and during at least one subsequent request by the second computing device for service profile data associated with the first computing device, accessing at least one of the one or more stored profiles at the second device instead of transmitting a service profile request to the first device.

In a third aspect of the invention, a computer readable apparatus comprising a storage medium is disclosed. In one embodiment, the medium comprises instructions which, when executed by a processing device, cause transmission of one or more service profiles associated with a first transport via a second transport not associated with the one or more service profiles, the instructions comprising: a first instruction adapted to gather the one or more service profiles; and a second instruction adapted to cause transmission the one or more service profiles via the second transport.

In one variant, the first transport comprises a Bluetooth transport, and the act of transmitting causes termination or prevention of a Bluetooth service discovery session.

In another variant, the apparatus further comprises a third instruction that, when executed by the processing device, stores the one or more service profiles locally so that it is accessible via a service discovery application.

In a further variant, the second transport comprises an IEEE Std. 802.11-compatible transport.

In a fourth aspect of the invention, a computerized device is disclosed. In one embodiment, the device comprises: a digital processor; a first wireless network interface associated with a first protocol; a second wireless network interface associated with a second protocol; and a memory comprising instructions that, when executed by the digital processor: receive a request for service profile data relating to the first protocol of the computerized device; collect one or more service profiles associated with the first protocol; and transmit, via the second wireless network interface, the one or more service profiles to another computerized device.

In one variant, the first protocol comprises a Bluetooth protocol, and the instructions cause a Bluetooth service discovery session that would otherwise be run not to be run.

In another variant, the device further comprises a service discovery application resident in the memory, wherein the one or more service profiles are stored in the memory so that they are accessible by the service discovery application, the service discovery application able to communicate with other like applications via the second network interface. The second network interface comprises e.g., a wireless local area network (WLAN) or WiMAX interface. In yet another variant, the computerized device further comprises instructions that when executed by the digital processor: request service profile information from a remote user device; and store the profile information about the remote user locally when received over the second network interface.

In still a further variant, the device comprises a display element, the display element presenting a graphical user interface to a user, the graphical user interface displaying the remote user profile information. The remote user profile information comprises at least one service profile supporting communications via the first protocol, and remote user profile information further comprises state information regarding first protocol operation by the remote user.

In another variant, the computerized device comprises a cellular telephony interface and a touch-screen control system.

In a fifth aspect of the invention, a system is disclosed, the system comprising: a first transport; a second transport; and first and second user devices each having access to the first and second transports; wherein at least one of the devices comprises a computer program adapted to: request service information relating to the first transport from the other device; receive the service information from the other device via the second transport; and store the received information for access during at least one subsequent service request, the access obviating the need for a service information transfer over the first transport.

In a sixth aspect of the invention, methods of doing business based on the aforementioned methods and/or apparatus are disclosed.

Other features and advantages of the present invention will immediately be recognized by persons of ordinary skill in the art with reference to the attached drawings and 5 detailed description of exemplary embodiments as given below.

BRIEF DESCRIPTION OF THE DRAWINGS

FIG. 2 is a block diagram illustrating exemplary system architecture useful in implementing the alternate transport service discovery procedure in accordance with one embodiment of the present invention.

FIG. 6 illustrates an exemplary GUI interface (window) for displaying devices and the service profiles associated therewith in accordance with the present invention.

DETAILED DESCRIPTION OF THE INVENTION

Figure 1:
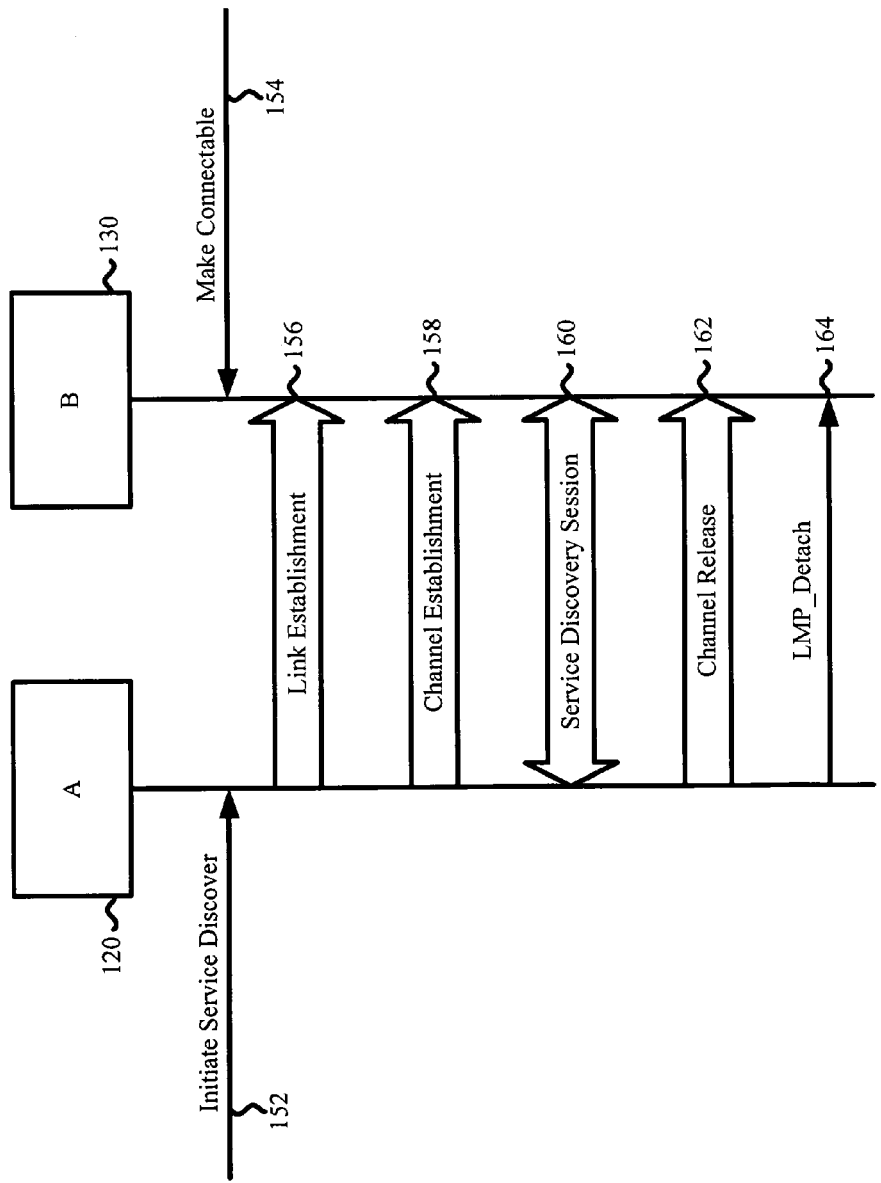
FIG. 1 is a graphical illustration of a prior art control messaging flow for an exemplary Bluetooth service discovery procedure.
Figure 1A:
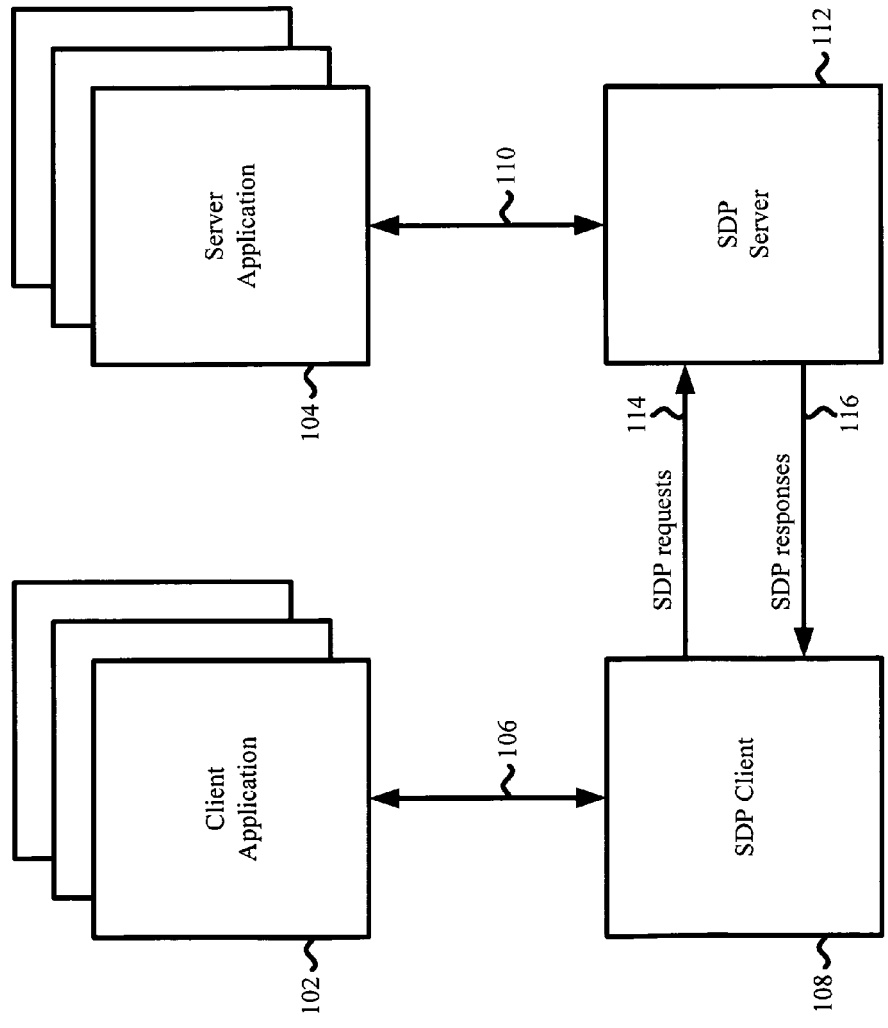
FIG. 1A is a block diagram illustrating a prior art service discovery session.

As used herein, the term "Bluetooth" refers without limitation to any device, software, interface or technique that complies with one or more of the Bluetooth technical standards, including Bluetooth Core Specification Version 1.2, Version 2.0, and Version 2.1+EDR, each of the foregoing incorporated herein by reference in its entirety.

As used herein, the terms "client device", and "end user device" include, but are not limited to cellular telephones, smart phones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, and ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and Telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, ATM, X.25, Frame Relay, 3GPP, 3GPP2, WAP, SIP, UDP, FTP, RTP/RTCP, H.323, etc.).

As used herein, the terms "network interface" or "interface" typically refer to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or 00B, cable modem, etc.), WiFi (802.11a,b,g,n), WiMAX (802.16), PAN (802.15), IrDA or other wireless families.

As used herein, the term "service" is meant include, without limitation, any capability or functionality (or set of capabilities or functionalities) provided by a device or network, including e.g., the Bluetooth Service Discovery Profile (SDP).

As used herein, the term "transport" refers without limitation to any transport protocol capable of transmitting data over a physical interface (PHY) such as e.g., transport control protocol (TCP), user datagram protocol (UDP), datagram congestion control protocol (DCCP), real-time transport protocol/real-time transport control protocol (RTP/RTCP), and stream control transmission protocol (SCTP).

As used herein, the term "wireless" means any wireless signal, data, communication, or other interface including without limitation Wi-Fi, Bluetooth, 3G (e.g., 3GPP, 3GPP2, and UMTS), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for providing service discovery information over alternate transport paths that are not normally associated with such services. In one exemplary implementation, information regarding Bluetooth service profiles is provided over a transport normally associated with a wireless LAN network interface. Prior art Bluetooth implementations use a Service Discovery Profile (SDP) to find remote device services (e.g., printing, object exchange, etc.); SDP is a Bluetooth specification-defined protocol that is typically performed before two devices can be used together to exchange data. SDP can be burdensome however, such as when a large number of devices and device profiles need to be discovered.

Accordingly, the present invention provides methods and apparatus implementing a faster, improved communication protocol experience between two or more end-user devices. In one embodiment, users employing a service discovery protocol (such as the exemplary Bonjour protocol) are able to advertise their Bluetooth device services over other communication transports and protocols, such as the ubiquitous TCP/IP via an 802.11 (WiFi) or 802.16 (WiMAX) network interface. This advertisement and transfer of information is performed in an anticipatory fashion where possible. By providing service profile information over an alternate transport path, latencies associated with prior art techniques of establishing and exchanging BT protocol service profile information are minimized, resulting in improved user experience.

Moreover, once the transfer of service profile data from one device to a second device has occurred, any subsequent request for the transferred service profile data is handled locally, thereby obviating the negotiation, link establishment, and transfer procedures normally used (whether on the primary or alternate transport modality). In this fashion, each device "learns" and remembers the service profile capabilities of other devices with which it has been in contact. In addition, service profile data will be periodically updated between the first and second devices. In one embodiment, this is handled via the utilization of a time stamping scheme. The devices will analyze the service profile data and if it has changed, the device will update the service profile data to include the information contained with the latest time stamped data.

Advantageously, the methods and apparatus of the present invention may be adapted to any number of wired or wireless protocol/service combinations as well.

DETAILED DESCRIPTION OF EXEMPLARY EMBODIMENTS

Exemplary embodiments of the present invention are now described in detail. While these embodiments are primarily discussed in the context of transmitting Bluetooth service profiles over an alternate transport such as a local area network (LAN) or wireless local area network (WLAN), it will be recognized by those of ordinary skill that the present invention is in no way so limited. In fact, the principles of the present invention may readily be applied to other communication protocols and transports, whether wired or wireless. For example, the invention may be applied to the transmission of Bluetooth service profile data over a WiMAX, MWBA (IEEE-Std. 802.20), IEEE Std. 802.15, or cellular (e.g., UMTS/3GPP/3GPP2, etc.) PHY/transport. Further, the present invention is not limited to the transmission of Bluetooth service profile data over an alternate transport; in fact the present invention may be readily adapted so that information about the services provided at a specific geographic location could be obtained via an alternate transport. For example, a user could utilize his iPhone to access and locally cache the WiFi or Bluetooth capabilities of a particular coffee shop via the iPhone's cellular services (e.g. CDMA, GSM, etc.).

Apparatus—

Referring now to FIG. 2, exemplary system architecture 200 useful for implementing the methodologies of the present invention is illustrated. At a minimum, the system architecture 200 requires communication between two devices 202, 204. 30 Communication between a given device and multiple other devices simultaneously may also occur. In one embodiment, these devices 202, 204 advantageously comprise client devices such as for example the MacBook™ Air manufactured by the assignee hereof. Alternatively, one of these devices 202 may comprise an iPhone™ manufactured by the assignee hereof, while the other device might for instance comprise a photo printer capable of communicating over multiple transports. Any number of other combinations of homogeneous (i.e., similar or identical) and/or heterogeneous (different) devices will be recognized by those of ordinary skill given the present disclosure.

Each of the devices illustrated in FIG. 2 will further comprise a plurality of different communication transports 206, 208, 210. These communication transports 206, 10 208, 210 may utilize any number of different communication protocols and associated underlying physical layer (PHY) hardware, whether wireless or wired. Some of the more popular communication transports utilized today in computing devices possessing a LAN or WLAN network interface include TCP/IP and UDP. Other communication transports include the now ubiquitous Bluetooth transport, which is utilized in a wide array of client devices such as cellular telephones or smartphones, mobile or laptop computers, and the like. In one exemplary implementation, these communication transports 206, 208, 210 comprise a TCP/IP transport over a LAN network interface, TCP/IP transport over a WLAN network interface, and a Bluetooth transport over a Bluetooth network interface, respectively. Moreover, while three (3) transports are illustrated in FIG. 2, the invention can be practiced with as few as two (2) transports.

Figure 3:
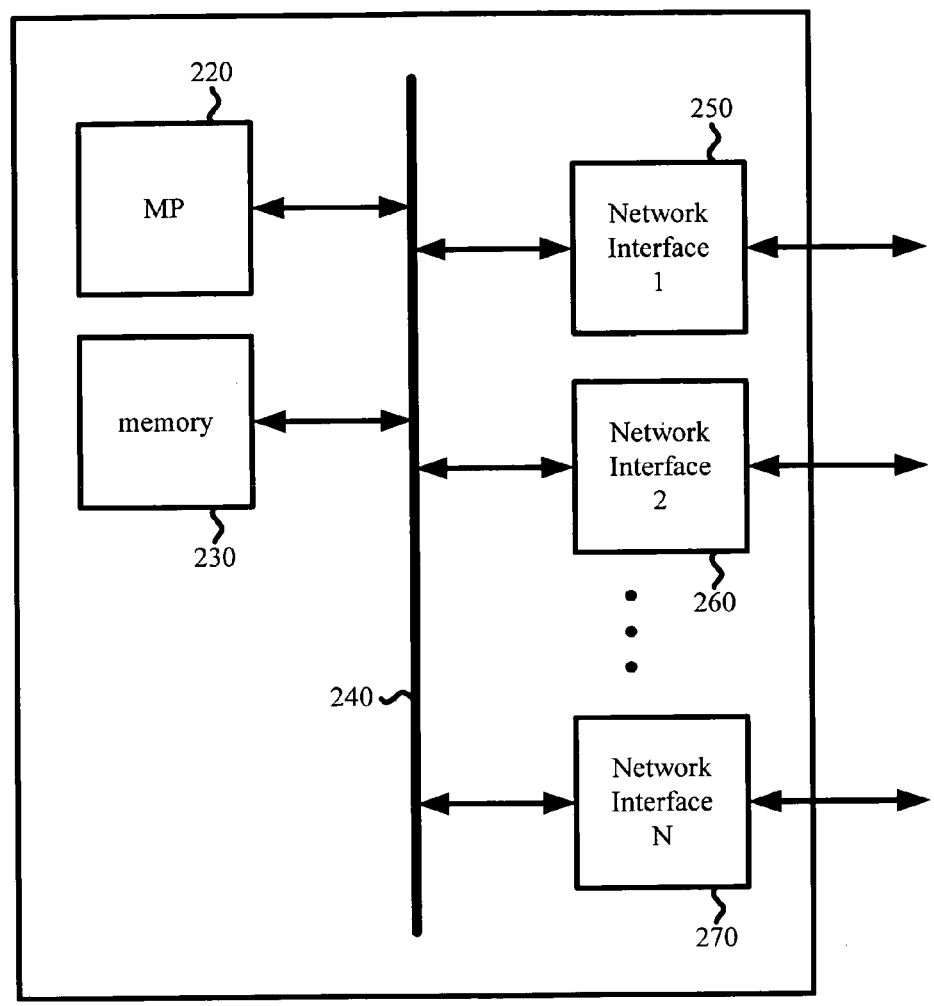
FIG. 3 is a functional block diagram illustrating one embodiment of a device architecture useful with the system of FIG. 2.

FIG. 3 illustrates an exemplary architecture for a client device 202, 204. The client devices useful in implementing the present invention will typically share some common architectural features. These include a processing device, such as a microprocessor 220, a memory 230 and one or more data buses 240 coupled to a plurality of network interfaces 250, 260 and 270. At least two of these network interfaces utilize different transports, thereby permitting for the transmission of service or profile data relating to one protocol over a separate transport, as discussed in greater detail subsequently herein. While a specific architecture is shown in FIG. 3, it is recognized that any number of device architectures could readily be implemented by one of ordinary skill given the present disclosure. Accordingly, the architecture shown is merely illustrative of commonality between exemplary devices capable of executing the methodologies discussed below.

Methods—

Figure 4:
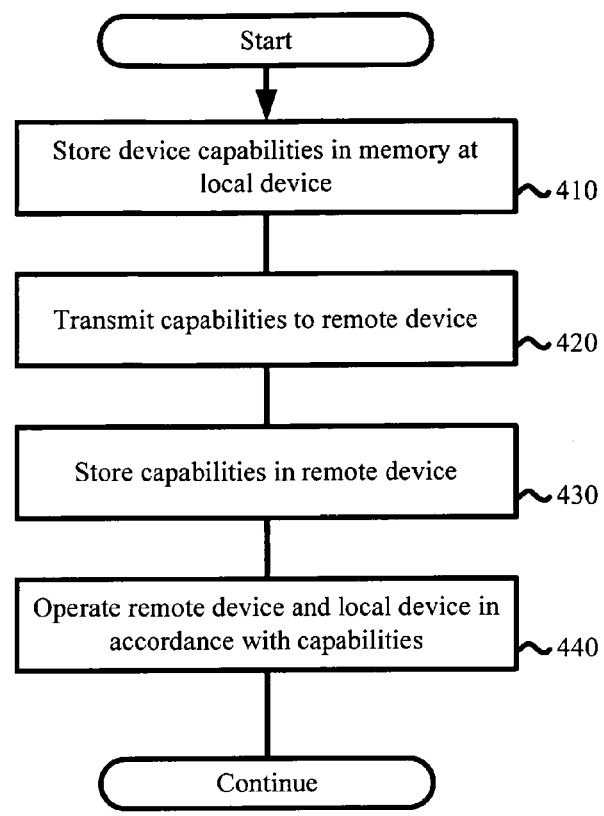
FIG. 4 is a logical flow diagram illustrating an exemplary methodology for transmitting local device capabilities to a remote device using an alternate transport according to the present invention.

Referring now to FIG. 4, a first exemplary embodiment of the process 400 for transmitting local device capabilities to a remote device to address the aforementioned disabilities of the prior art is illustrated.

At step 410, the local device stores capabilities (such as service profiles associated with a first communication protocol) in a storage medium readily accessible by a second communication protocol. In one embodiment, the first and second communication protocols comprise Bluetooth and WiFi, respectively. Discovery of the capabilities would preferably be handled by a software application resident to the local device which can query, for example, the Bluetooth hardware/software located at the local device, and ultimately determine the service profiles supported by that Bluetooth hardware/software implementation. This process can be handled in any number of ways. For example, a first variant might possess a listing that associates service profiles with a given communication protocol (in our example, Bluetooth and the known service profiles associated with Bluetooth). The software application can then cycle through the list of service profiles and query the Bluetooth hardware/software device to determine if the device supports the service profile that is queried. Alternatively, the software application could issue a blanket query command that would essentially ask: "What service profiles do you support?" The Bluetooth hardware/software device resident locally on the device would then respond to the software application by providing a listing of supported service profiles.

As an example of the foregoing, a query might reveal that the local device's Bluetooth device supports a Basic Printing Profile (BPP) in its local implementation of Bluetooth. This service profile capability is stored external to the Bluetooth protocol stack, so that it may be readily accessed by alternate communication transports (TCP/IP and the like, described elsewhere herein). This access will, in one embodiment, comprise accessibility by a software application such as Apple Inc.'s Bonjour service discovery protocol application, although it will be recognized that other applications and types may be used (to include for example client-server applications, distributed applications (DAs), etc.). As discussed previously, Bonjour is advantageously intended for use in local area networks, thereby facilitating the desired access and discovery of service profile information from the storage location.

While the storage of service profile information is considered particularly advantageous, the present invention is not so limited. In fact, the invention may readily be adapted to include the querying of additional information useful in facilitating the establishment of service capabilities between devices. For instance, in the context of Bluetooth, the capabilities stored could be expanded to include other Bluetooth state information. This state information may comprise useful information such as whether or not the local device currently has its Bluetooth radio on, whether or not it requires pairing to establish a connection, Bluetooth device addressing information, security mode (e.g., Mode 0, 1 or 2) information etc. See also the discussion with regards to FIG. 6 provided 15 below.

At step 420, the stored capabilities of the local device are transmitted to a remote device via an alternate transport; i.e. the via the network interface that is not associated with the stored capabilities or its primary transport. The transmitted service profiles and capabilities may be either pull-based or push-based; the local device may initiate the transfer of data to the remote device(s), or alternatively the data transfer may be initiated by the remote device and the data subsequently transmitted. In one exemplary implementation, the service profiles and device capabilities are periodically broadcast over an alternate transport. Other like devices on the network will listen in on this alternate transport for these periodic broadcasts. In another variant, the service profiles and device capabilities are transmitted upon the occurrence of an event; e.g., alternate link establishment or channel setup. Myriad other schemes will be recognized by those of ordinary skill given the present disclosure.

In the context of the exemplary Bonjour-based implementation discussed above, the transmission comprises accessing the Bluetooth profile information stored in memory 30 via the Bonjour application, and transmitting the profile information via a wireless LAN (WLAN), LAN (e.g., Ethernet), or other network interface. It will be recognized that as used herein, the term "network" may refer to as few as two devices coupled or in data communication with the access medium, such as e.g., a WLAN, USB or FireWire interface directly between two devices), although more complex topologies including intermediary devices are also contemplated.

In one exemplary implementation, the remote device will also comprise exemplary Bonjour software or a compatible software agent or process so as to provide compatibility between the devices. Alternatively, the Bonjour software may readily be adapted to communicate across any number of known software applications so that the profile information can be utilized by a remote device that does not possess the aforementioned Bonjour software.

In yet another variant, the invention comprises an effectively "passive" system, in that the local device profile can be broadcast and shared with all participating devices in a given communication transport. For instance, in one such variant, all devices connected to a particular wireless access point (AP) might periodically receive broadcast information about the service profiles and capabilities within that given AP. Such an implementation has advantages in that service profiles and capabilities will be transmitted in spite of inherent Bluetooth limitations or Bluetooth standard operating procedures.

At step 430, the transmitted service profile information and capabilities are stored 20 in memory at the remote device. In one embodiment, this information is stored in a Bonjour data record and subsequently made accessible in the remote device cache by the remote device Bluetooth software and/or hardware. Further, if information useful for link establishment and channel establishment is made available via the transmitted capabilities at 420, then this information is stored so that the respective Bluetooth radio devices of the local and remote device can utilize this information to assist the conventional link and channel establishment procedures when establishing a communications link.

Figure 4A:
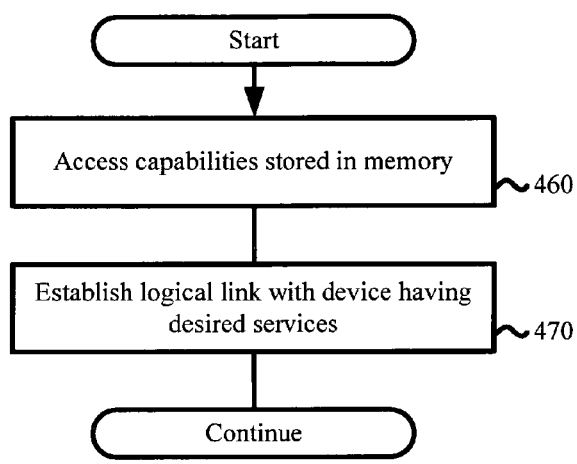
FIG. 4a is a logical flow diagram illustrating an exemplary methodology for establishing a logical link using capabilities received via an alternate transport in accordance with the present invention.

At step 440, the remote device and local device operate in accordance with the transmitted service profile and capabilities. In one embodiment, this is accomplished via a user selection on a graphical user interface (FIG. 6) at the remote device. As can be seen in FIG. 4a, a user logged on locally at the remote device accesses the capabilities previously transmitted that are stored in memory at step 460. This will, in an exemplary implementation, be initiated via the user selection of the service discovery software application resident on the remote device. Herein underscores another salient advantage of the present invention; i.e., that once two particular devices (or even devices of the same class, where a "template" service profile configuration is assumed) have been placed in communication and the service profile data transferred from the local to remote device, and subsequent accesses or requests for service profile data for the "remote" device (i.e., prior "local" device) are received, the stored data at the requesting device can be used in place of having to initiate a new request for the service profile data from the remote device via e.g., the Bluetooth transport or the alternate transport. This access of locally stored information economizes appreciably on communications over any transport between the two devices that occur after their initial contact.

Upon initiation of the service discovery software application, the user at the remote device will be presented with information (see exemplary GUI of FIG. 6) such as that relating to the devices present on a network 602, the services provided by these devices 604 and the state of operation or capabilities for each device 606. Alternatively, this information can be maintained at a lower layer for use by other processes, without necessarily having to present it to the user.

After a user (or cognizant software process) has selected a device that operates a service profile that the user desires, the remote device will establish a logical link with the device having the desired services at step 470. In the context of Bluetooth, this might for instance comprise performing the link and channel establishment procedures as normal (FIG. 1). It should be noted however that the service discovery session will be unnecessary, as the remote device will have already been made aware of the local device capabilities and profiles. This can be accomplished via application software which transmits information to the Bluetooth module letting it know that SDP is unnecessary and that the cached SDP data is up to date. If there is a subsequent failure between devices (e.g. due to SDP information which has become stale), the devices can then initiate a standard SDP session using conventional methodology, or alternatively employ another method for obtaining this information.

Appendix I hereto provides exemplary Bonjour code implementing one embodiment of the aforementioned methodology.

Appendix II provides an exemplary embodiment of a Bluetooth Bonjour record according to the invention.

It will be appreciated that the present invention also contemplates the use of a "permissive" mode or control function, somewhat akin to controls offered in contemporary devices for Bluetooth discovery and information transfer. For example, in one embodiment, service requests from a remote device will be evaluated against the control criteria applied by the user of the local device before service profile data (or other data) will be transferred over an alternate transport. A user may specify for instance that certain other devices/users, or classes of devices/users, will not be given access to profile data. Bluetooth pairing or bonding or other authentication mechanisms (e.g., 802.1x) may also be invoked as a prerequisite for service profile data transfer over the alternate transport.

Figure 5:
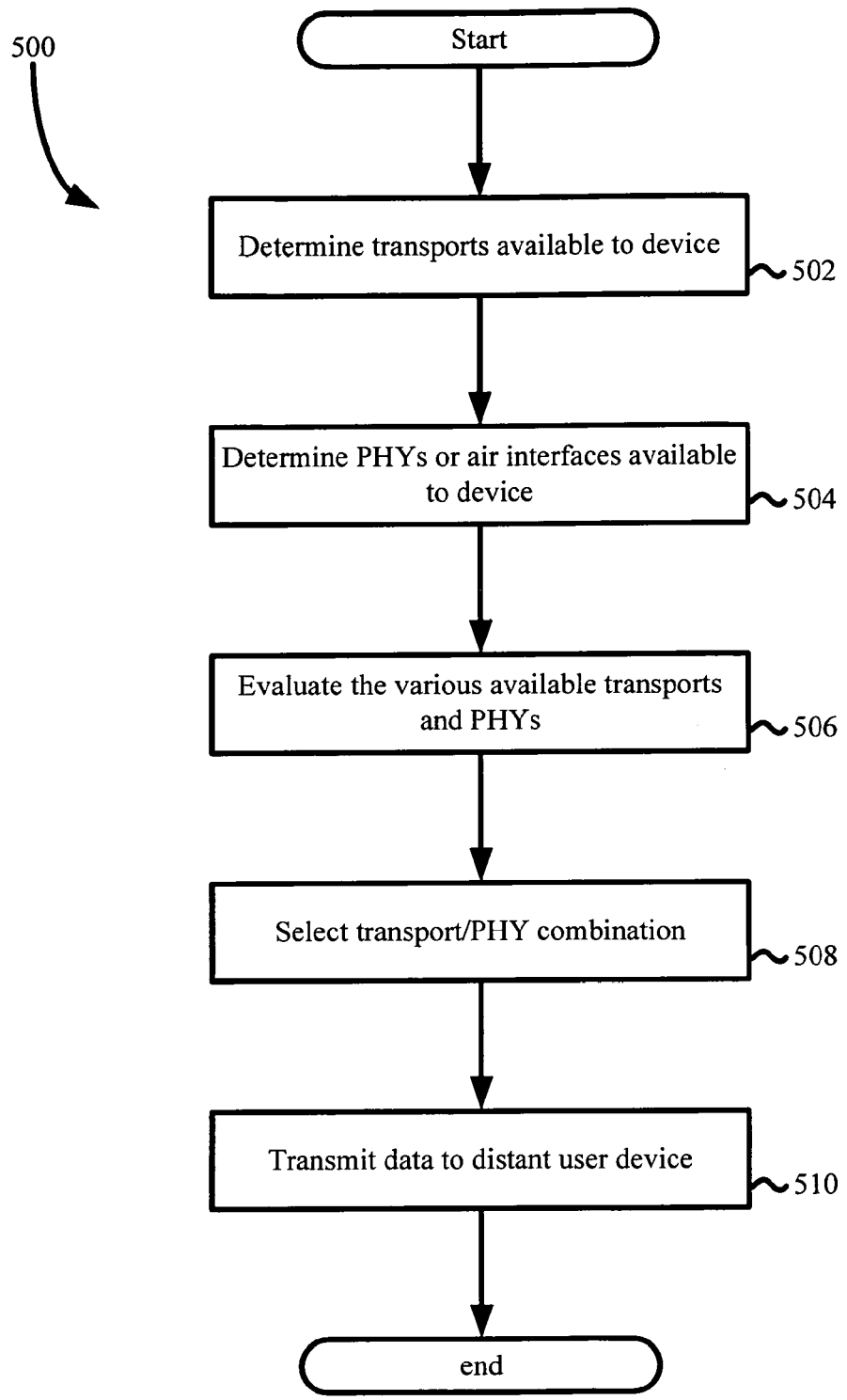
FIG. 5 is a logical flow diagram illustrating another embodiment of the methodology for transmitting local device capabilities to a remote device using an alternate transport, wherein a plurality of alternate transports are available.

Moreover, the alternate transport can be evaluated for sufficiency (see discussion of FIG. 5 presented herein) in terms of one or more evaluation criteria before the service profile data is allowed to be transmitted; e.g., whether the alternate transport has sufficient security, QoS, bandwidth, etc. to provide the service profile data to the requester in a complete, error-free, and/or sufficiently timely manner.

Example #1

In one use scenario, a number of people show up for a weekly meeting at Organization X. Each of the participants brings their Mac laptops, with each of these laptops having built-in Bluetooth hardware and software installed on their respective machines. All of the laptops join the same wireless local area network (e.g. Apple's 42net). The Bluetooth software has previously installed its own Bonjour record that indicates what Bluetooth services it has. Each laptop receives this information automatically via Bonjour and the wireless local area network connection via Apple's 42net. This information is then stored for the Bluetooth software to use, if needed. During the meeting, a user wants a send a file to one (or more) of the people in the room via Bluetooth. The user selects the destination(s) of the Bluetooth device that the user wishes to send the file to, and instead of having to perform the traditional steps of inquiring to find devices that have the file sharing service (SOP), the sender computer already has the information about the remote device(s) and can send the file without having to perform the traditional service discovery process. This allows for the file transfer in effectively real time, versus the conventional service discovery procedures which could be deficient in some way (i.e. by being error prone or otherwise possessing significant latencies associated with it). This benefit in reduced latency is further multiplied when that same user wishes to send the file to multiple people in the meeting.

Multi-Transport Methodology

Referring now to FIG. 5, an alternate methodology for transmitting service or device data over a transport is described. In this embodiment of the method 500, an appropriate transport is first evaluated and selected. Optionally (or alternatively), an appropriate PHY is also selected, as now discussed in greater detail.

Specifically, as shown in FIG. 5, the first step 502 of the method comprises determining all transports available to a given device for possible use by the higher level process within a given user device 202, 204. For example, a software process operative to run on a user device may include a look-up table or other such mechanism that is populated with the list of currently available transports for the user device as a whole; e.g.: (i) TCP/IP; (ii) UDP; and (iii) RTP/RTCP.

Per step 504, the aforementioned software process next determines the PHYs or air interfaces available to the device, such as e.g.: (i) Bluetooth; (ii) WLAN (802.11); (iii) WiMAX (802.16); and (iv) FireWire (IEEE 1394). Optionally included in these steps 502, 504 may also be a determination as to which transports and/or PHYs are physically available (e.g., a link with the one or more other user devices 202, 204 is established and operative). One selection criteria may include for example whether a physical link and logical channel are presently established (thereby obviating additional latency in setting up such a link/channel).

Next, per step 506, the various available transports discovered in step 502 and PHYs discovered in step 504 are evaluated by the software process in order to select that combination most appropriate to the transfer. In one implementation, only certain allowed combinations are made available, thereby allowing the software process to 5 simply evaluate a set of predetermined transport/PHY combinations based on one or more criteria, such as e.g., QoS, latency, or available bandwidth. For instance, as noted above, a simple selection criteria may comprise whether the PHY link/channel is currently established or not. As another example, if QoS is required for the service data transfer, and a given transport/PHY combination does not support this requisite level of QoS, 10 another combination would be selected. Or, if one combination is currently being 100% utilized by another process (e.g., broadband data streaming, etc.), then an alternate would be selected.

Yet another criteria might comprise the complexity of negotiation needed to establish a link and logical channel to the distant user device process. As previously noted herein in the context of the Bluetooth protocol, one primary impetus for using an alternate transport in the present invention is to obviate the lengthy and time-consuming negotiation and setup procedures associated with the prior art Bluetooth SDP. Accordingly, different transports may be graded or rated as to the latency or complexity associated with their setup and transfer procedures, with the aforementioned software process utilizing this grade or rating to select that which will minimize latency (or optimize some other parameter such as bandwidth consumption or QoS).

Still another criteria for evaluation of different transports and/or PHYs may be cost. For instance, use of one combination may cost the user more than use of another, such as due to additional charges imposed by a service provider or carrier which the user employs for providing its network (e.g., Internet) connectivity.

Myriad different evaluation criteria and scenarios will be recognized by those of ordinary skill given the present disclosure.

In another implementation, multiple different transport/PHY combinations are available, and the software process may evaluate each or a selected subset of the 30 transports and/or PHYs individually based on one or more evaluation criteria.

Per step 508, one of the transport/PHY combinations is selected, and the relevant service profile data transmitted to the distant user device per step 510.

Graphical User Interface—

Referring now to FIG. 6, an exemplary embodiment of a graphical user interface (GUI) 600 useful for presenting service profile information to a user is illustrated. The GUI window 600 displays information about the other devices within a network. In one embodiment, the user will select from a drop down menu the communications protocol that the user wishes to learn network information about. In the embodiment shown, the communications protocol of interest to the user is Bluetooth. After selecting the Bluetooth protocol, the GUI window 600 presents information about the Bluetooth devices available to the user in a device column 602. In the embodiment shown in FIG. 6 there are three (3) devices available to the user: a printer device; and two (2) laptops (e.g., Mac Book laptop devices).

In an exemplary implementation, the user can rename the default names of the devices so that it is more readily apparent to the user in the future to which device they intend to connect. For example, Mac Book 1 may belong to the user's co-worker Frank. Accordingly, the user can rename Mac Book 1 so that it will in the future display as "Frank's Laptop". In yet another embodiment, the name displayed on the GUI window 600 will be controlled by the operator of that device themselves. In the above described usage scenario, Frank can choose a name for his Mac Book so that the name Frank as chosen will display in the GUI window 600 in the device column 602 when viewed by other users associated with the AP.

The GUI window 600 further includes a services provided column 604. This column will allow the user to quickly ascertain which service profiles are supported by that particular device without first having to establish a service discovery session as was illustrated in FIG. 1. In the embodiment shown, the device named "Printer" possesses the Basic Printing Profile (BPP) Bluetooth profile. Other service profiles are also associated with other devices accessible within the network. In one embodiment, an additional column (not shown) illustrates the service profiles supported by the user device.

Accordingly, a user will be able to correlate his/her capabilities with the capabilities of other devices in the network. Other methods include highlighting or displaying the service profiles in the services provided column 604 with a distinguishing characteristic (e.g. bolded lettering, or colored lettering) in order for a user to quickly assess compatibility between a user device and other devices on the network.

Alternatively, the service profiles displayed in column 604 will only be displayed if these profiles are also supported by the user's computing device. Accordingly, the services provided column 604 will not be exhaustive of the service profiles actually supported by the devices in the device column 602, rather the service profiles listed in column 604 will merely be those that are also supported by the user's computing device. In one embodiment, such a scheme also has advantages in that during the service discovery session, a user's computing device need only query the devices on the network for those service profiles that the user's computer supports.

The exemplary GUI window 600 further comprises an active status column 606 which provides information about whether or not the device is active for receipt of connections. In the context of Bluetooth, this column 606 might be indicative of whether or not the Bluetooth radio is currently on, or whether the device is able to accept additional Bluetooth piconet participants. In an alternative embodiment, the active column 606 might further be indicative of other parameters that could affect the ability for the user to connect to a device on the network such as, for example, received signal strength indication (RSSI), etc.

It will be appreciated that while a GUI "window" is shown and described in the exemplary embodiment of FIG. 6, other user interfaces (whether graphical or otherwise) may be used consistent with the invention. For example, a non-window based GUI such as an iconic representation, bar status indicator in a toolbar, etc. may be used to indicate various status or functions. Alternatively, an audible user interface might be employed, wherein different sounds or tones are used to correlate to different transports, status, etc. Myriad other alternatives will be recognized by those of ordinary skill given the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

Business Methods—

In another aspect of the invention, business methods based on the aforementioned service discovery capabilities are disclosed. Specifically, in one embodiment, a client or end user device manufacturer may differentiate their product line (and pricing if desired) based on the capability of using alternate transports within the device for purposes of enhanced service discovery. For example, a prior art Bluetooth and WiFi-capable device would still perform Bluetooth service profile discovery according to the traditional methods discussed previously herein, whereas an "enhanced" version of the same device would perform more rapid service discovery using the improved techniques and apparatus of the present invention, especially in the context of multi-user service discovery (see, e.g., the meeting-room Example presented above). Accordingly, purchasers of the device may be willing to pay more for such capability, or alternatively the manufacturer could provide this capability free-of-charge (e.g., as an incentive or differentiating factor over a competitor's products).

Similarly, a manufacturer may provide a retrofit or upgrade to extant products (e.g., via software download or firmware installation) which provides the aforementioned alternate transport capability.

In another aspect, an operator of a WiFi Access Point (AP)/hotspot or similar network operator may charge an additional fee for (or offer as an incentive or promotion) the capability to use the WiFi AP as a secondary transport for Bluetooth or other "primary" transport service discoveries. For instance, in the context of the foregoing meeting room Example, the meeting room provider or manager might only allow access to the WiFi AP for certain classes of customer (e.g., those who paid an additional premium to have enhanced service discovery for the many individuals in the meeting), etc.

In another aspect, the present invention may be utilized to access additional capabilities associated with a device or between devices and/or provide enhanced network security. For example, in one exemplary embodiment, a user may have a device which possesses both Bluetooth and WiFi networking capabilities; however the device requires a passkey in order for the user to access the Bluetooth capabilities of the device. The user must purchase the Bonjour application (or a device which possesses the Bonjour application) so that the user may access a Bonjour service record containing the passkey necessary to operate their Bluetooth radio. This passkey would be utilized to pair with other like devices.

In the context of security, enhanced security is provided via the utilization of the passkey obtained from the Bonjour service record. Because the passkey necessary to utilize the Bluetooth radio is never transmitted over a Bluetooth transport, traditional methods for intercepting the transmission of a Bluetooth passkey would be ineffectual. In this way, an alternate transport is utilized in order to, not only gain access to one or more Bluetooth service profiles thereby providing additional capabilities for a user device, but in a way so as to provide enhanced security features for a user when exchanging data over Bluetooth.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

APPENDIX I

Exemplary Bonjour ™ Code
© Copyright 2008 Apple Inc. All rights reserved.

```
#include <dlfcn.h>
#include <CoreServices/CoreServices.h>
include <dns_sd.h>
#include <IOBluetooth/IOBluetoothUserLib.h>
typedef void (*IOBluetoothReadAddressCallback )(void *inContext, OSStatus
inStatus, BluetoothDeviceAddress *inAddr );
typedef IOReturn
    (*IOBluetoothLocalDeviceReadAddressfunc )(
        BluetoothDeviceAddress *          outAddr,
        IOBluetoothReadAddressCallback    inCallback,
        void *                            inUserRefCon,
        void *                            inReserved );
int main( int argc, const char * argv[ ] )
    OS Status                                              err;
    IOBluetoothLocalDeviceReadAddress func     func;
    BluetoothDeviceAddress                          addr;
    BluetoothDeviceName                                name;
    BluetoothHClVersionlnfo                     info;
    uint8_t *                                            a;
    TXTRecordRef                                       txt;
    uint8_t                                          buf[
256 ];
    char                                             str[
256 ];
    int
n;
    DNSServiceRef                                    sdRef;
    // Get the local computer's Bluetooth Device Address from the Mac OS X Bluetooth
stack.
    func = (IOBluetoothLocalDeviceReadAddress _func) dlsym( RT-LD_DEFAULT,
"I0BluetoothLocalDeviceReadAddress" );
    require_action( func, exit, err = −1 );
    err = func( &addr, NULL, NULL, NULL );
    require_noerr( err, exit );
    a = addr. data;
    // create the Bonjour record.
    TXTRecordCreate( &txt, (uint16_t) sizeof( buf ), buf );
    // Stuff the Bluetooth address into the record.
    n = snprintf( str, sizeof( str ), "%02X:%02X:%02X:%02X:%02X:%02X", a[ 0 ],
a[ 1 ], a[ 2 ], a[ 3 ], a[ 4 ], a[ 5 ]);
    err = TXTRecordSetValue( &txt, "bdaddr", (uint16_t) n, str );
    require_noerr( err, exit );
    // Get the local computer's Bluetooth name and stuff it into the record.
    err =IOBluetoothLocalDeviceReadName( name, NULL, NULL, NULL );
    require_noerr( err, exit );
    n = snprintf( str, sizeof( str ), "%s", (char*) name );
    err = TXTRecordSetValue( &txt, "name", (uintl6_t) n, str );
    require_noerr( err, exit );
    // Get the local computer's Bluetooth version information and stuff it into the
record.
    err = IOBluetoothLocalDeviceReadVersionlnformation( &info, NULL, NULL, NULL );
    require_noerr( err, exit );
    n = snprintf( str, sizeof( str ), "lmp: %d.%d / hci: %d.%d", info.lmpVersion,
info.lmpSubVersion, info. hci Version, info.hciRevision );
    err = TXTRecordSetValue( &txt, "lmp version", (uintl6_t) n, str );
    require_noerr( err, exit );
    if( info.manufacturerName — 15 ) n = snprintf( str, sizeof( str ), "Broadcom" );
    else if( info.manufacturerName == 10 ) n = snprintf( str, sizeof( str ), "CSR" );
    err = TXTRecordSetValue( &txt, "mfg", (uintl6_t) n, str );
    require noerr( err, exit );
    // Make the record public so all Bonjourclients can see it.
    sdRef = NULL;
    err = DNS ServiceRegister( &sdRef, 0, 0, NULL, "_bluetooth._tcp", NULL, NULL,
htons( 1234 ),
    TXTRecordGetLength( &txt ), TXTRecordGetBytesPtr( &txt ), NULL,
NULL );
    require_noerr( err, exit );
    // Wait here forever.
    for( ;; )
    {
    sleep( 1 );
    }
```

APPENDIX I-continued

Exemplary Bonjour ™ Code
© Copyright 2008 Apple Inc. All rights reserved.

Exit:
  return( err? 1 : 0);
}

APPENDIX II

Exemplary Bluetooth Bonjour ™ Record Copyright 2008 Apple Inc.
All rights reserved.

➢ _bluetooth._tcp. - 1
  ➢ Bubba's Mac Pro 8 Core
    17.206.46.131:1234
    [fe80::219:e3ffie66:ae1a1:1234
    192.168.222.1:1234
    192.168.73.1:1234
    bdaddr=00:1F:SB:FF:87:04
    name=Bubba's Mac Pro 8 Core
    Imp version=lrnp: 4.8596 1 hd: 4.222
    mfg=Broadcom

What is claimed is:

1. A method for communicating information, the method comprising:
by a first device:
receiving device-capability information from a second device using a first communication interface; and
performing, based on the device-capability information, at least one function with the second device using a second communication interface,
wherein the device-capability information obviates service discovery between the first device and the second device using the second communication interface.

2. The method of claim 1, wherein the first communication interface comprises a Bluetooth interface and the second communication interface comprises a Wi-Fi interface.

3. The method of claim 1, wherein the device-capability information is received following an occurrence of an event.

4. The method of claim 1, wherein the first device initiates communication with the second device over the first communication interface.

5. The method of claim 1, further comprising:
by the first device:
transmitting a request for the device-capability information to the second device,
wherein the receiving of the device-capability information is in response to the request.

6. The method of claim 1, wherein the device-capability information comprises a service profile associated with the second communication interface.

7. The method of claim 1, further comprising:
by the first device:
storing the received device-capability information.

8. The method of claim 1, further comprising:
by the first device:
establishing a connection, prior to performing the at least one function, with the second device using the second communication interface, based at least in part on the device-capability information.

9. The method of claim 1, wherein the device-capability information includes network-access information.

10. The method of claim 1, wherein the first device is communicatively connected to a wireless access point.

11. A non-transitory computer readable storage medium configured to store instructions that, when executed by a processor in a second device, cause the second device to perform the following operations:
by the second device:
transmitting device-capability information to a first device using a first communication interface; and
performing, based on the device-capability information, at least one function with the first device using a second communication interface,
wherein the device-capability information obviates service discovery between the first device and the second device using the second communication interface.

12. The non-transitory computer readable storage medium of claim 11, wherein the first communication interface comprises a Bluetooth interface and the second communication interface comprises a Wi-Fi interface.

13. The non-transitory computer readable storage medium of claim 11, wherein the device-capability information is transmitted following an occurrence of an event.

14. The non-transitory computer readable storage medium of claim 11, wherein the device-capability information includes network-access information.

15. The non-transitory computer readable storage medium of claim 11, wherein the operations further comprise:
by the second device:
receiving a request for the device-capability information from the first device,
wherein the transmitting of the device-capability information is in response to the request.

16. A first device, comprising:
an interface circuit configured to communicate with a second device using a first communication interface or a second communication interface;
wherein the first device is configured to:
transmit a request for device-capability information to the second device using the first communication interface;
receive the device-capability information from the second device using the first communication interface; and
perform, based on the device-capability information, at least one function with the second device using the second communication interface,
wherein the device-capability information obviates service discovery between the first device and the second device using the second communication interface.

17. The first device of claim 16, wherein the first communication interface comprises a Bluetooth interface and the second communication interface comprises a Wi-Fi interface.

18. The first device of claim 16, wherein the device-capability information is requested following an occurrence of an event.

19. The first device of claim 16, wherein the device-capability information includes network-access information.

20. The first device of claim 16, wherein the first device is further configured to establish a connection, prior to performing at least the one function, with the second device using the second communication interface, based at least in part on the device-capability information.

* * * * *